(12) United States Patent
Okamoto et al.

(10) Patent No.: US 8,423,812 B2
(45) Date of Patent: Apr. 16, 2013

(54) TIME CORRECTION IN A SEMICONDUCTOR DEVICE USING CORRECTION INFORMATION PROVIDED BY AN ADJACENT SEMICONDUCTOR DEVICE

(75) Inventors: Akira Okamoto, Kawasaki (JP); Seiji Satta, Kawasaki (JP); Makoto Hataida, Kawasaki (JP); Takayuki Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 142 days.

(21) Appl. No.: 12/926,596

(22) Filed: Nov. 29, 2010

(65) Prior Publication Data

US 2011/0078431 A1    Mar. 31, 2011

Related U.S. Application Data (63) Continuation of application No. PCT/JP2008/060204, filed on Jun. 3, 2008.

(51) Int. Cl.
*G06F 1/12* (2006.01)
*G06F 9/00* (2006.01)
*G06F 9/24* (2006.01)
*G06F 15/177* (2006.01)
*G06F 15/16* (2006.01)

(52) U.S. Cl.
USPC ............ 713/400; 713/1; 713/2; 713/100; 713/375; 709/248

(58) Field of Classification Search ............ None
See application file for complete search history.

(56) References Cited

U.S. PATENT DOCUMENTS

| 6,832,326 | B2 * | 12/2004 | Kubo et al. ............ 713/400 |
| 7,356,617 | B2 * | 4/2008 | Suzuki et al. ............ 709/248 |
| 2004/0049706 | A1 * | 3/2004 | Strong ............ 713/400 |
| 2005/0055469 | A1 * | 3/2005 | Scheele ............ 710/1 |

FOREIGN PATENT DOCUMENTS

| JP | 62-204365 | 9/1987 |
| JP | 02-245837 | 10/1990 |
| JP | 03-282959 | 12/1991 |
| JP | 04-182806 | 6/1992 |
| JP | 04-275611 | 10/1992 |
| JP | 05-17747 | 3/1993 |
| JP | 10-028119 | 1/1998 |
| JP | 2003-345773 | 12/2003 |

OTHER PUBLICATIONS

International Search Report for corresponding International Application PCT/JP2008/060204.

* cited by examiner

*Primary Examiner* — Ji H Bae
(74) *Attorney, Agent, or Firm* — Staas & Halsey LLP (57) ABSTRACT

In an information processing apparatus that includes a first and second semiconductor devices that are connected to each other and also includes a system control device that is connected to the first and second semiconductor devices, the timers that are mounted on the semiconductor devices are all synchronized by successively performing a timer correction process between a semiconductor device in which the timer is synchronized and a semiconductor device, adjacent to the semiconductor device, in which the timer is not synchronized, and, when an error occurs in the information processing device, the value in the synchronized timer and the error information are stored in a predetermined register.

6 Claims, 8 Drawing Sheets

| REGISTER NAME | | VALUE |
|---|---|---|
| CHIP ID | | 001 |
| ADJACENT CHIP INFORMATION | PORT 1 ID | xxx |
| | PORT 2 ID | xxx |
| | PORT 3 ID | 002 |
| | PORT 4 ID | xxx |
| CORRECTION COMPLETION FLAG | | 0 |
| ERROR | ERROR LOG FLAG | 0 |
| | ERROR INFORMATION | xA001 |
| | TIMER VALUE | 70 |

TIME CORRECTION IN A SEMICONDUCTOR DEVICE USING CORRECTION INFORMATION PROVIDED BY AN ADJACENT SEMICONDUCTOR DEVICE

CROSS-REFERENCE TO RELATED APPLICATION

This application is a continuation of International Application No. PCT/JP2008/060204, filed on Jun. 3, 2008, the entire contents of which are incorporated herein by reference.

FIELD

The embodiments discussed herein are directed to an information processing apparatus, a method of controlling an information processing apparatus, and a semiconductor device.

BACKGROUND

In a conventional large-scale computer system that includes multiple chips, an error that occurs in the hardware that is contained in the computer system is detected and information on the detected error and information on the time at which the error occurred are stored in a register that is a storage device. A system managing apparatus, managing the computer system, accesses a register in which information on the error is stored and analyzes the error.

Figure 9:
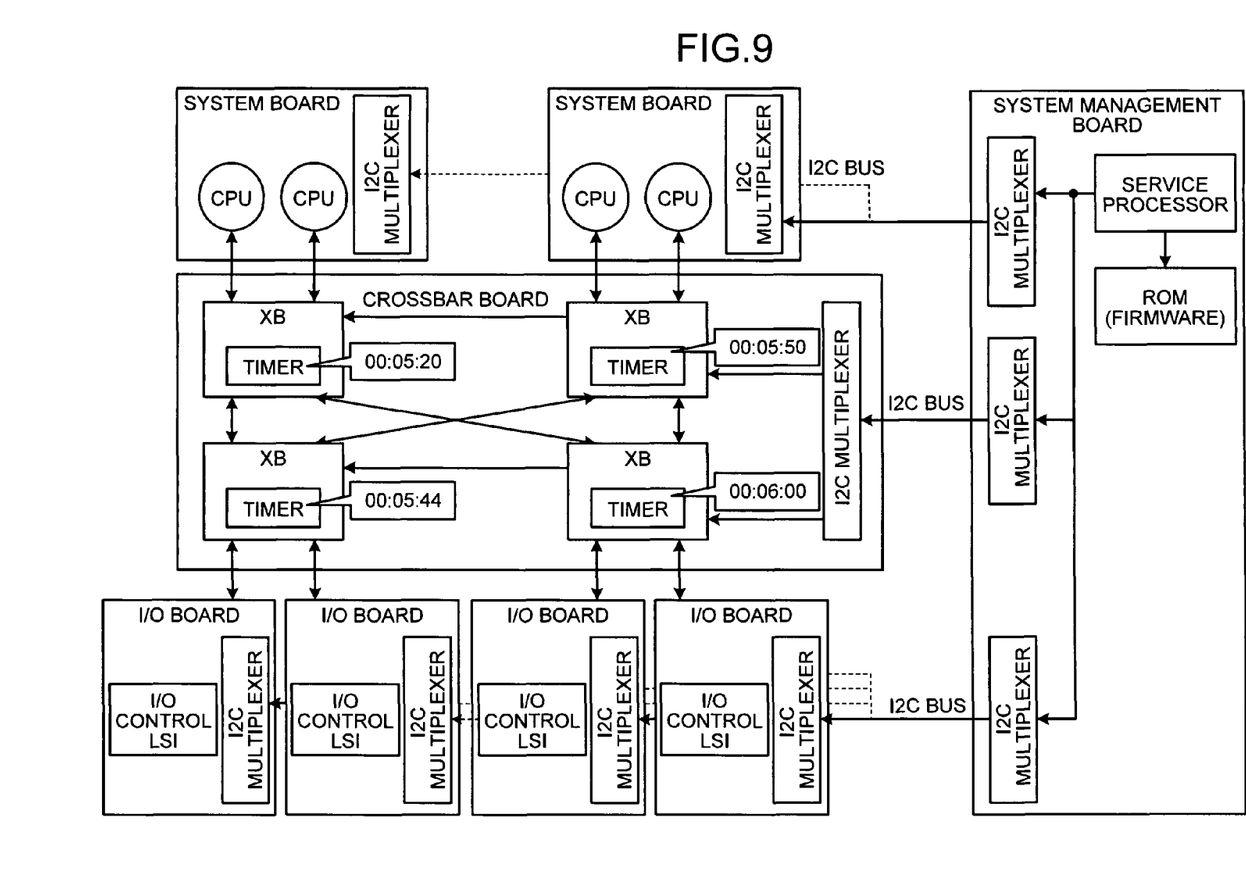
FIG. 9 is a diagram of a configuration example of a system according to a conventional technology.

A configuration of the above-described computer system will be described below with reference to FIG. 9. FIG. 9 is a diagram of a configuration example of the system according to the conventional technology. The system illustrated in FIG. 9 includes system boards on each of which central processing units (CPUs) are mounted, a crossbar board on which crossbar chips each including a timer are mounted, I/O boards on each of which a large scale integrated (LSI) circuit that controls the I/O device is mounted, and a system management board (MMB) that is a service processors (SVP) and on which firmware that manages the system is mounted. The system management board accesses the register of each chip via an inter-integrated circuit (I2C) bus.

For example, once a slave address and a channel of an I2C multiplexer that is an upper-level device with respect to a chip that is to be accessed are specified, the system management board is connected to the board on which the chip to be accessed is mounted. The system management board then specifies the slave address of the chip to be accessed and starts communications. The system management board then refers to the error information and the timer value (time information) that are stored in the register of the accessed chip and analyzes, for example, how the error occurred.

However, as illustrated in FIG. 9, in a system in which broadcast communications cannot be performed, it is difficult to analyze an error that has occurred in the hardware. Specifically, in a system configuration in which broadcast communications cannot be performed, because the timers of the chips are not synchronized, it is not possible to analyze how an error occurred according to the timer value that is stored in the register and is referred to on the occurrence of the error.

To synchronize the timers (time information) in the above-described large-scale system, various technologies are disclosed in, for example, Japanese Laid-open Patent Publication No. 10-28119 and Japanese Laid-open Patent Publication No. 04-182806.

The above-described conventional technologies, however, have a problem in which it takes time to complete a process for synchronizing the timers (time information).

SUMMARY

According to an aspect of an embodiment of the invention, an information processing apparatus includes a first semiconductor device and a second semiconductor device that are connected to each other, and a system control device that is connected to the first semiconductor device and the second semiconductor device, wherein the first semiconductor device includes a first time counter that counts the time by storing first time count information, a first storage unit that stores a first flag representing that the first time count information, which is stored in the first time counter, has been corrected, a first initialization controller that initializes the first time count information, which is stored in the first time counter, when the system control device updates the first flag, an initialization command transmitter that transmits an initialization command to the second semiconductor device according to an instruction from the first initialization controller when the first initialization controller initializes the first time count information that is stored in the first time counter, a correction time count information request receiver that receives a correction time count information request from the second semiconductor device after the initialization command transmitter transmits an initialization command to the second semiconductor device, and a correction time count information transmitter that transmits correction time count information to the second semiconductor device according to an instruction from the first initialization controller when the correction time count information request receiver receives a correction time count information request from the second semiconductor device, and the second semiconductor device includes a second time counter that counts the time by storing second time count information, a second storage unit that stores a second flag representing that the second time count information, which is stored in the second time counter, has been corrected; an initialization command receiver that receives the initialization command that is transmitted by the initialization command transmitter, a second initialization controller that initializes the second time count information, which is stored in the second time counter, when the initialization command receiver receives the initialization command, a correction time count information request transmitter that transmits a correction time count information request to the first semiconductor device according to an instruction from the second initialization controller when the second initialization controller initializes the second time count information, which is stored in the second time counter, a correction time count information receiver that receives the correction time count information, which is transmitted by, the correction time count information transmitter, and a correction controller that sums correction time count information, which is received by the correction time count information receiver, and the second time count information, stores the resulting value in the second time counter, and updates the second flag.

According to another aspect of an embodiment of the invention, a semiconductor device that is connected to a system control device, includes a time counter that counts the time by storing time count information, a storage unit that stores a flag representing that the time count information, which is stored in the time counter, has been corrected, an initialization controller that initializes the time count information, which is stored in the time counter, when the system control device updates the flag or when an initialization command is received from an adjacent semiconductor device that is adjacent to the semiconductor device, an initialization command transmitter that transmits an initialization command to the adjacent semiconductor device according to an instruction from the initialization controller when the initialization controller initializes the time count information that is stored in the time counter, an initialization command receiver that receivers the initialization command that is transmitted by the adjacent semiconductor device, a correction time count information request transmitter that transmits a correction time count request to the adjacent semiconductor device according to an instruction from the initialization controller when the initialization controller initializes the time count information that is stored in the time counter, a correction time count information request receiver that receives a correction time count information request, which is transmitted from the adjacent semiconductor device, after the initialization command transmitter transmits an initialization command to the adjacent semiconductor device, a correction time count information transmitter that transmits correction time count information to the adjacent semiconductor device according to an instruction from the initialization controller when the correction time count information request receiver receives a correction time count information request from the adjacent semiconductor device, a correction time count information receiver that receives the correction time count information, which is transmitted by the adjacent semiconductor device, and a correction controller that sums correction time count information, which is received by the correction time count information receiver, and the time count information, stores the resulting value in the time counter, and updates the flag.

According to still another aspect of an embodiment of the invention, a method of controlling an information processing apparatus that includes a first semiconductor device and a second semiconductor device that are connected to each other, and a system control device that is connected to the first semiconductor device and the second semiconductor device, the method includes counting the time by storing first time count information, storing, in a first storage unit, a first flag representing that the first time count information has been corrected, initializing the first time count information when the system control device updates the first flag, transmitting an initialization command to the second semiconductor device when the first time count information that is initialized, receiving a correction time count information request that is transmitted by the second semiconductor device after an initialization command is transmitted the second semiconductor device, transmitting correction time count information to the second semiconductor device when a correction time count information request that is transmitted by the second semiconductor device, counting the time by storing second time count information, storing a second flag representing that the second time count information has been corrected, receiving the initialization command that is transmitted by the first semiconductor device, initializing the second time count information when the initialization command that is transmitted by the first semiconductor device, transmitting a correction time count information request to the first semiconductor device when the second time count information is initialized, receiving the correction time count information that is transmitted by the first semiconductor device, and summing correction time count information, which is transmitted by the first semiconductor device, and the second time count information, updating the second time count information, and updating the second flag.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. An overview and characteristics of an information processing apparatus according to a first embodiment of the present invention and a configuration and a process flow of the information processing apparatus will be described in the sequence they appear in this sentence and the effects of the embodiments will be explained at the end.

[a] First Embodiment

Overview and Characteristics

Figure 1:
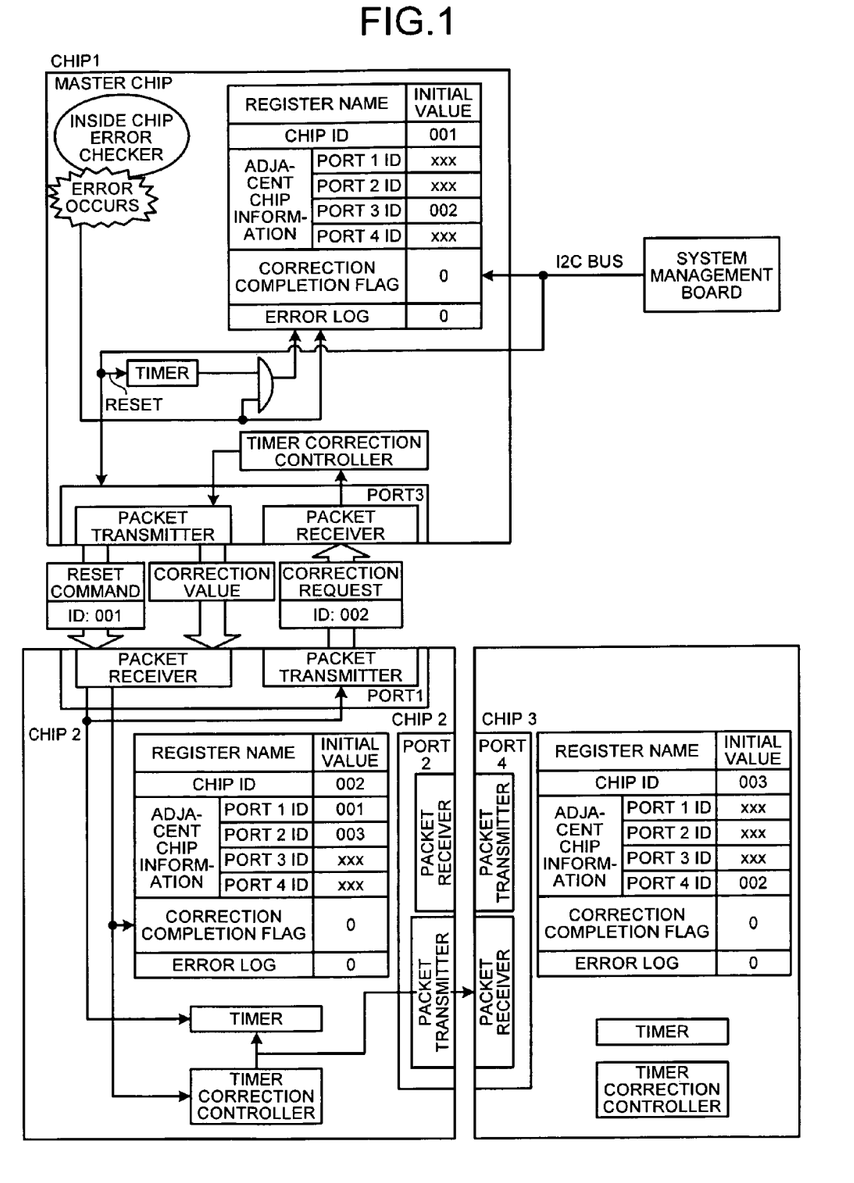
FIG. 1 is a diagram illustrating an overview and characteristics of an information processing apparatus according to a first embodiment of the present invention.

First, an overview and characteristics of an information processing apparatus according to the first embodiment of the present invention will be explained. FIG. 1 is a diagram illustrating an overview and characteristics of the information processing apparatus according to the first embodiment.

The information processing apparatus disclosed in this application includes system boards on each of which CPUs are mounted, a crossbar board on which a crossbar chip that includes timers is mounted, I/O boards on each of which an LSI that controls the I/O device is mounted, and a system management board on which firmware that manages the information processing apparatus is mounted.

The system management board accesses each chip via an I2C bus, refers to error information and a timer value (time information) that are stored in a register of the accessed chip, and analyzes how the error occurred. Hereinafter, the multiple chips that are connected to the system management board will be described as three chips: a chip 1, a chip 2, and a chip 3. However, the number of chips is not limited to three.

In overview, the information processing apparatus with the above-described configuration includes first and second semiconductor devices that are connected to each other and includes a system control device that is connected to the first and second semiconductor devices. In particular, the main characteristic of the information processing apparatus is in that the time required to complete a process for synchronizing the timers (time information) can be shortened.

The main characteristics of the information processing apparatus will be described here. The first semiconductor device in the information processing apparatus is connected to the system control device. The first semiconductor device includes a first time counter that stores first time count information and thus counts the time, and the first semiconductor device also includes a first storage unit that stores a first flag representing that the first time count information that is stored in the first time counter has been corrected.

For example, the chip 1 of the information processing apparatus is connected to the system management board. The chip 1 includes a timer that counts the time, and the chip 1 also includes a register that stores a correction completion flag representing that the time count information that is stored in the timer has been corrected.

The second semiconductor device of the information processing apparatus is connected to the system control device. The second semiconductor device includes a second time counter that stores second time count information and thus counts the time, and the second semiconductor device also includes a second storage unit that stores a second flag representing that the second time count information that is stored in the second time counter has been corrected.

For example, the chip 2 of the information processing apparatus is connected to the system management board. The chip 2 includes a timer that counts the time, and the chip 2 also includes a register that stores a correction completion flag representing that time count information that is stored in the timer has been corrected.

With the above configuration, when the system control device updates the first flag, a first controller of the first semiconductor device initializes the first time count information that is stored in the first time counter.

Specifically, when the system management board updates the correction completion flag that is stored in the register of the chip 1 to "1", a timer correction controller of the chip 1 initializes the time count information that is stored in the chip 1 as "0".

When the first controller initializes the first time count information that is stored in the first time counter, a first transmitter of the first semiconductor device transmits an initialization command to the second semiconductor device according to an instruction from the first controller.

This will be specifically described here using the above example. When the timer correction controller initializes the time count information that is stored in the timer of the chip 1 as "0", a packet transmitter of the chip 1 transmits a command for initializing the timer of the chip 2 to the chip 2 according to an instruction from the timer correction controller.

A second receiver of the second semiconductor device receives the initialization command that is transmitted by the first transmitter. Thereafter, when the second receiver receives the initialization command, a second controller of the second semiconductor device initializes the second time count information that is stored in the second time counter. When the second controller initializes the second time count information that is stored in the second time counter, a second transmitter of the second semiconductor device transmits a correction time count information request to the first semiconductor device according to an instruction from the second controller.

This will be specifically described here using the above-described example. A packet receiver of the chip 2 receives a command for initializing the timer, which is transmitted by the chip 1. When the packet receiver receives the command for initializing the timer, a timer correction controller of the chip 2 initializes the time count information that is stored in the timer of the chip 2 as "0". Subsequently, when the timer correction controller of the chip 2 initializes the time count information that is stored in the timer as "0", a packet transmitter of the chip 2 transmits a correction time count information request to the chip 1.

After the first transmitter transmits the initialization command to the second semiconductor device, the first receiver of the first semiconductor device receives the correction time count information request from the second semiconductor device. When the first receiver receives the correction time count information request from the second semiconductor device, the first transmitter of the first semiconductor device transmits correction time count information to the second semiconductor device according to an instruction from the first controller.

This will be specifically described here using the above-described example. After the packet transmitter of the chip 1 transmits the command for initializing the timer to the chip 2, a packet receiver of the chip 1 receives the correction time count information request from the chip 2. When the packet receiver of the chip 1 receives the correction time count information request from the chip 2, the packet transmitter of the chip 1 transmits correction time count information "15" to the chip 2 according to an instruction from the timer correction controller of the chip 1.

The second receiver of the second semiconductor device receives the correction time count information that it transmitted by the first transmitter. The second controller of the second semiconductor device then sums the correction time count information that is received by the second receiver and the second time count information, stores the resulting value in the second time counter, and updates the second flag.

This will be specifically described here using the above example. The packet receiver of the chip 2 receives the correction time count information "15" that is transmitted by the packet transmitter of the chip 1. The timer correction controller of the chip 2 stores, in the timer of the chip 2, "45", which is obtained by summing the correction time count information "15" that is received by the packet receiver and a timer value "30" in the chip 2, and then the timer correction controller of the chip 2 updates the correction completion flag that is stored in the register of the chip 2 to "1".

When the timer correction in the chip 2 is completed, the chip 2 transmits a command for initializing the timer to the chip 3, and the chip 3 performs the timer correction process like the chip 2.

In other words, when each timer receives a correction time count information request from an adjacent chip after transmitting a timer initialization command to the adjacent chip, the chip transmits correction time count information to the adjacent chip. Each chip sums the correction time count information, which is received from an adjacent chip, and the timer value, corrects the timer, and updates the correction completion flag. In other words, the timers that are contained in all the chips that are mounted on the information processing apparatus are synchronized by repeatedly performing the above-described correction process via the chips.

In addition, when an error occurs in the hardware after the timer correction process is completed, each chip updates the error log flag to "1" and stores the information on the error and the timer value at the occurrence of the error in the register. The system management board accesses the register of the chip in which the error log flag has been updated to "1", refers to the stored error information and the timer value, and analyzes how the error occurred.

As described above, in the information processing apparatus, the multiple chips that are mounted on the information processing apparatus repeatedly perform the timer correction process via the chips and thus all the timers can be synchronized. Accordingly, the time that is required to complete the process for synchronizing the timers (timer information) can be shortened.

In other words, in the information processing apparatus, because the timers are synchronized by repeatedly performing the timer correction process via the timers, the time required to complete the process for synchronizing the timers (time information) can be shortened compared with the case, like the conventional technology, in which each timer correction process is performed between a single chip and a single master device of the chip and thus it takes time to transmit and receive packets between the master device and each of the chips.

Configuration of Semiconductor Device

Figure 2:
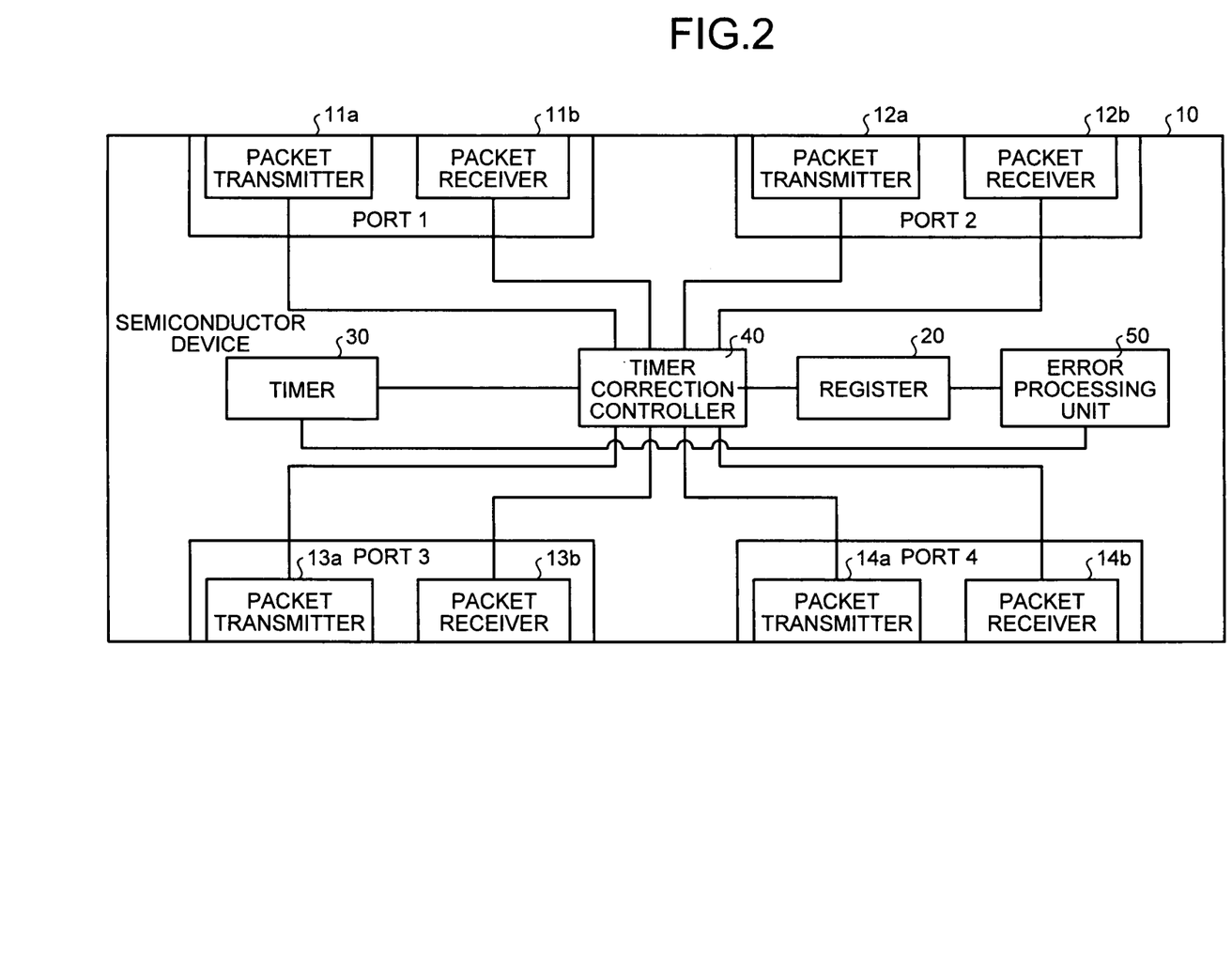
FIG. 2 is a block diagram of a configuration of a semiconductor device according to the first embodiment.

The semiconductor device according to the first embodiment will be described here with reference to FIG. 2. FIG. 2 is a block diagram of the configuration of the semiconductor device according to the first embodiment. As illustrated in FIG. 2, a semiconductor device 10 includes packet transmitters 11a to 14a, packet receivers 11b to 14b, a register 20, a timer 30, a timer correction controller 40, and an error processing unit 50. Hereinafter, the semiconductor device 10 is described as the chip 1 and the chip that is connected to the semiconductor device 10 is described as the chip 2.

Figure 3:
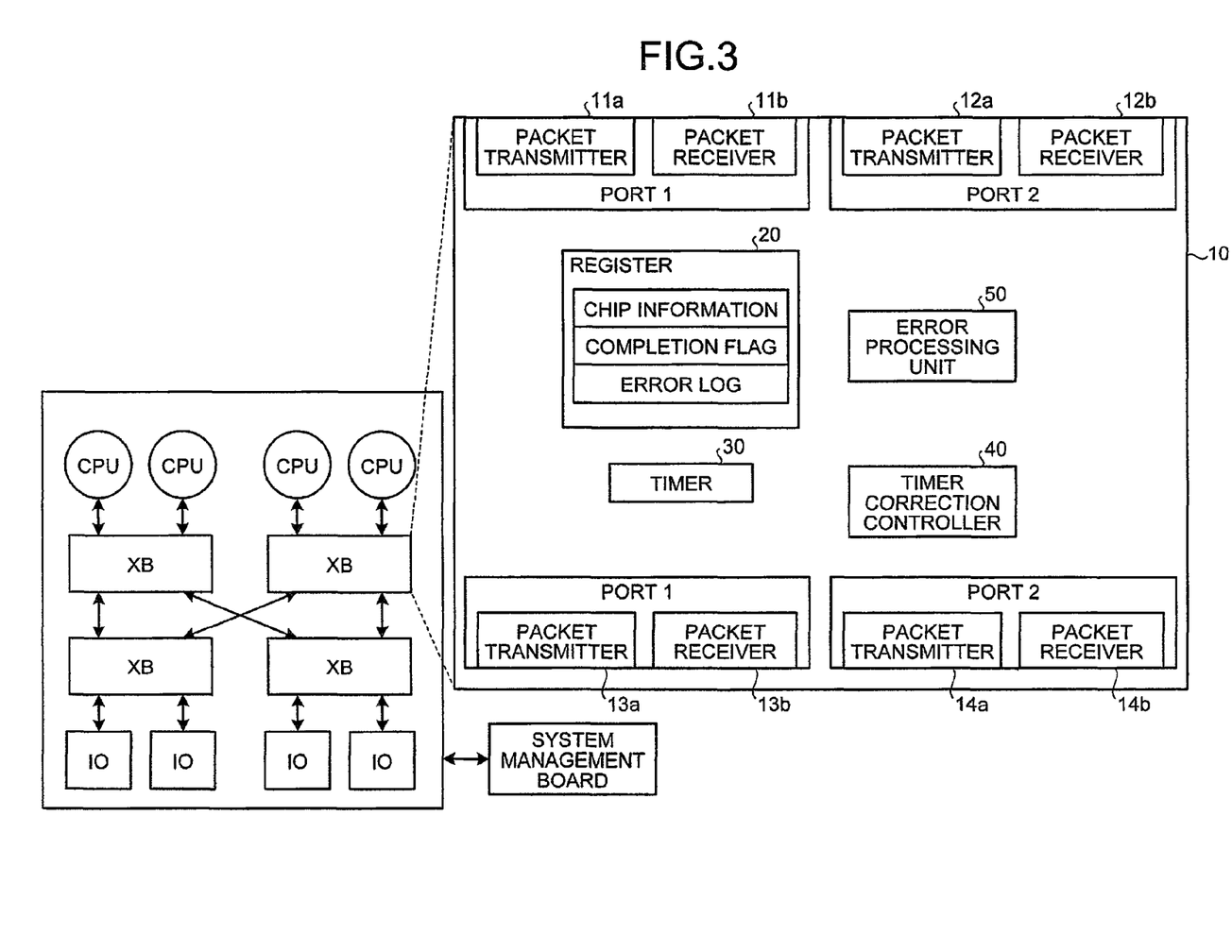
FIG. 3 is a diagram of a configuration example of the information processing apparatus according to the first embodiment.

As illustrated in FIG. 3, the semiconductor device 10 is disposed in an information processing apparatus that includes a system board on which CPUs are mounted, a crossbar board on which crossbar chips each including a timer are mounted, I/O boards on each of which an LSI that controls the I/O device is mounted, and a system management board on which firmware that controls the system is mounted. FIG. 3 is a diagram of a configuration example of the information processing apparatus according to the first embodiment.

The packet transmitters 11a to 14a and the packet receivers 11b to 14b control communications of various types of information that are received by and transmitted to another semiconductor device that is connected to the semiconductor device 10.

For example, when the timer correction controller 40 initializes time count information that is stored in the timer 30 of the chip 1 as "0", the packet transmitter 11a of the chip 1 transmits a command for initializing the timer of the chip 2 to the chip 2 according to an instruction from the timer correction controller 40. The packet receiver of the chip 2 receives the command for initializing the timer, which is transmitted by the packet transmitter 11a.

Subsequently, when the timer correction controller of the chip 2 initializes the time count information that is stored in the timer as "0", the packet transmitter of the chip 2 transmits a correction time count information request to the chip 1 according to an instruction from the timer correction controller. After the packet transmitter 11a transmits the command for initializing the timer to the chip 2, the packet receiver 11b of the chip 1 receives the correction time count information request from the chip 2.

When the packet receiver 11b receives the correction time count information request, the packet transmitter 11a of the chip 1 transmits correction time count information "15" to the chip 2 according to an instruction from the timer correction controller 40. The packet receiver of the chip 2 then receives the correction time count information "15" that is transmitted by the packet transmitter 11a. When a packet transmitter transmits packets, the packet transmitter transmits the chip ID of its own device that is stored in the register of the chip. The chip that receives the chip ID transmits packets (replies) according to the received chip ID.

The register 20 stores data that is necessary for various processes, which are performed by the timer correction controller 40 and the error processing unit 50, and stores various process results of the timer correction controller 40 and the error processing unit 50. The timer 30 stores the time count information of the semiconductor device 10 and thus counts the time.

Figure 4:
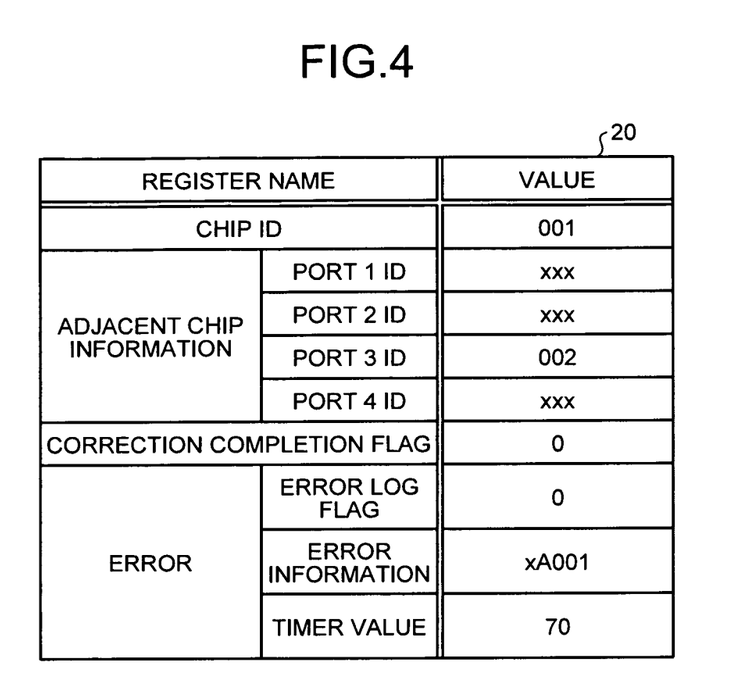
FIG. 4 is a diagram of an example of information that is stored in a register according to the first embodiment.

For example, as illustrated in FIG. 4, the register 20 stores "Chip ID:001" that represents the chip ID of the semiconductor device 10, "Port3 ID:002" that represents adjacent chip information that is information on a semiconductor device that is adjacent to the semiconductor device 10; "Correction completion flag:0" that represents whether correction of the timer 30 is completed in the multiple semiconductor devices, "Error log flag:0", of the error information, that represents whether an error has occurred; "Error information:xA001", of the error information, that represents the contents of the error; and "Timer information:70", of the error information, that represents the value of the timer at the occurrence of the error. FIG. 4 is a diagram of an example of the information that is stored in the register 20 according to the first embodiment.

When the system management board updates the correction completion flag, the timer correction controller 40 initializes the time count information in the semiconductor device 10 that is stored in the timer 30. For example, when the system management board updates the correction completion flag that is stored in the register 20 of the semiconductor device 10 to "1", the timer correction controller 40 initializes the time count information that is stored in the timer 30 of the semiconductor device 10 as "0".

When the initialization command that is transmitted by the chip 1 is received, the timer correction controller of the chip 2 initializes the time count information that is stored in the timer of the chip 2. For example, when the packet receiver of the chip 2 receives the initialization command, the timer correction controller of the chip 2 initializes the time count information that is stored in the timer of the chip 2 as "0".

The timer correction controller of the chip 2 sums the correction time count information, which is received by the packet receiver of the chip 2, and the time count information in the timer of the chip 2, stores the resulting value in the timer, and updates the correction completion flag of the chip 2. For example, the timer correction controller of the chip 2 stores, in the timer of the chip 2, "45", which is obtained by summing the correction time count information "15" received by the packet receiver of the chip 2, and the time count information "30" in the timer of the chip 2, and then the timer correction controller of the chip 2 updates the correction completion flag that is stored in the register of the chip 2 to "1".

When an error occurs in the hardware of the semiconductor device 10, the error processing unit 50 stores, in the register 20, the timer value at the occurrence of the error and the contents of the error. For example, when an error occurs in the hardware of the semiconductor device 10 after the timer correction process on the timer 30 of the semiconductor device 10 is completed, the error processing unit 50 stores the timer value "70" at the occurrence of the error and the error contents "xA001" of the error in the register 20.

Figure 5:
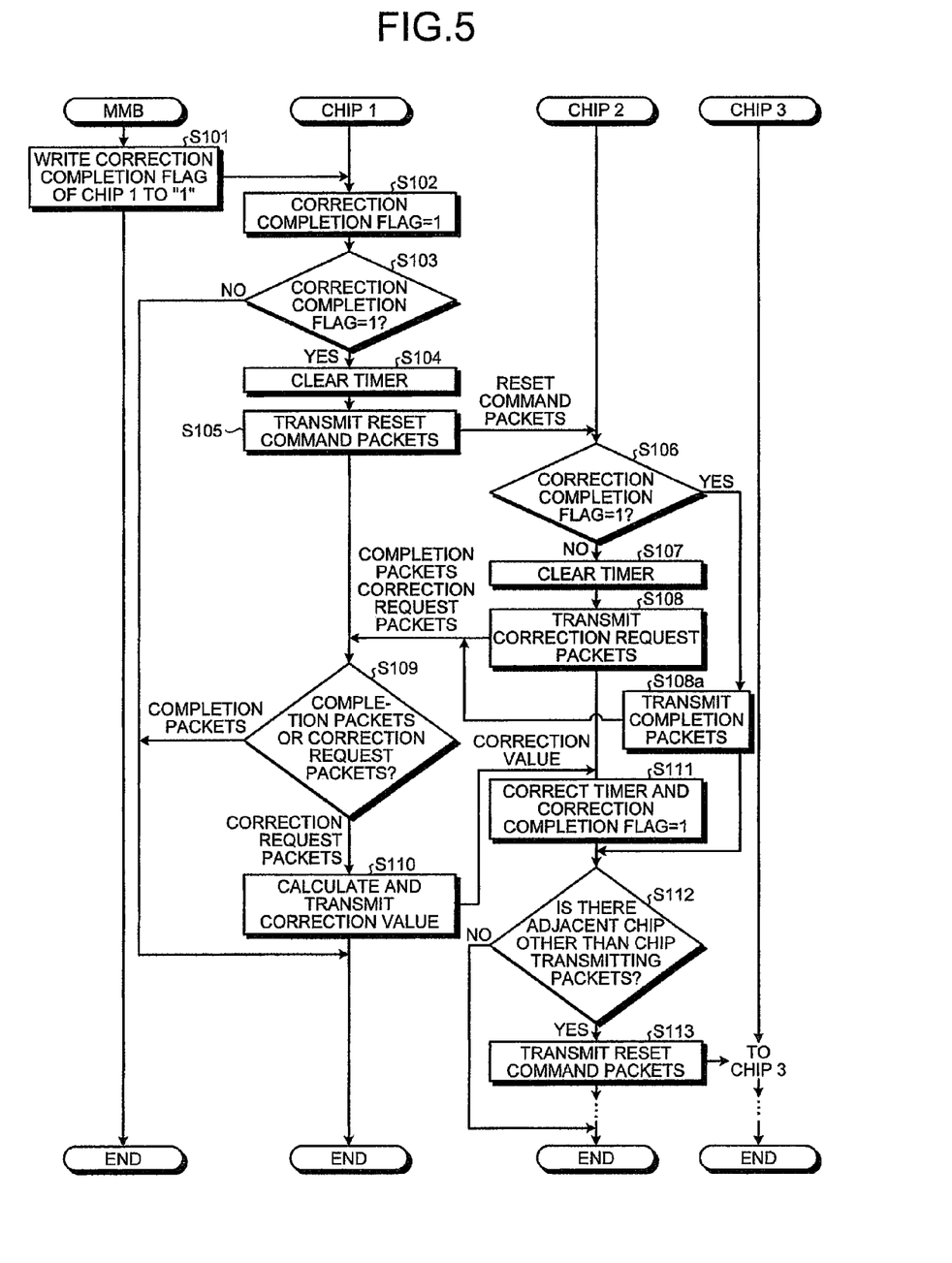
FIG. 5 is a sequence chart of a procedure of a timer correction process according to the first embodiment.

Process performed by information processing apparatus according to first embodiment The timer correction process, which is performed by the information processing apparatus according to the first embodiment, will be described here with reference to FIG. 5. FIG. 5 is a sequence chart of the procedure of the timer correction process according to the first embodiment. Hereinafter, the timer correction process concerning the system management board (MMB) and the chips 1 to 3 will be described.

As illustrated in FIG. 5, the system management board issues an instruction for updating the correction completion flag, which is stored in the register of the chip 1, to "1" (step S101). The chip 1 updates the correction completion flag, which is stored in the register of the chip 1, to "1" (step S102).

When the correction completion flag is updated to "1" (YES at step S103), the chip 1 initializes the time count information, which is stored in the register of the chip 1, as "0" (step S104). When the time count information, which is stored in the register of the chip 1, is initialized as "0", the chip 1 transmits command packets (reset command packets), which contain the chip ID of its own chip "001", for initializing the timer of the chip 2 to the chip 2 (step S105). When the correction completion flag is not updated to "1" (NO at step S103), the chip 1 completes the process.

When the correction completion flag that is stored in the register of the chip 2 is "0" (NO at step S106), the chip 2 that has received the reset command packets from the chip 1 initializes the time count information, which is stored in the timer of the chip 2, as "0" (step S107). When the time count information that is stored in the timer of the chip 2 is initialized as "0", the chip 2 transmits correction time count information request packets (correction request packets) that contain the chip ID "002" of the chip 2 to the chip 1 in accordance with the chip ID "001" that is received from the chip 1 (step S108).

Thereafter, the chip 1 that has received the correction time count request from the chip 2 determines whether the received packets are completion packets or correction request packets (step S109). When the packets that are received by the chip 2 are correction request packets (correction request packets at step S109), the chip 1 calculates the correction value "15". The chip 1 then transmits, in addition to the correction value "15", packets that contain the chip ID "001" of the chip 1 to the chip 2 in accordance with the chip ID "002" that is received from the chip 2 (step S110).

The chip 2 that has received the correction value "15" from the chip 1 stores "45", which is obtained by summing the received correction value "15" and the timer value "30" in the chip 2, in the timer of the chip 2 and updates the correction completion flag that is stored in the register of the chip 2 to "1" (step S111).

Thereafter, the chip 2 determines whether there is an adjacent chip, other the chip 1 that transmits the packets, in accordance with the chip ID "001" that is received from the chip 1 (step S112). When there is the chip 3 adjacent to the chip 2 (YES at step S112), the chip 2 transmits command packets (reset command packets), which contain the chip ID "002" of the chip 2, for initializing the timer of the chip 3 to the chip 3 (step S113). When there is no adjacent chip (NO at step S112), the chip 2 recognizes that the correction process on all the timers is completed and ends the process.

When the correction completion flag that is stored in the register of the chip 2 is "1" (YES at step S106), the chip 2 that has received the reset command packets from the chip 1 transmits completion packets representing that the timer correction is completed to the chip 1 (step S108a). When the correction completion flag that is stored in the register of the chip 2 is "1" (YES at step S106), the chip 2 that has received the reset command packets from the chip 1 determines whether there is an adjacent chip, other than the chip 1 that transmits the packets, in accordance with the chip ID "001" that is received from the chip 1 (step S112).

Like the chip 2, the chip 3 that has received the reset command packets from the chip 2 initializes the timer of the chip 3 and transits correction request packets to the chip 2. The chip 2 that has received the correction request packets from the chip 3 calculates a correction value using the corrected timer value of the chip 2 and transmits the correction value to the chip 3. The chip 3 that has received the correction value from the chip 2 corrects the timer of the chip 3. Thereafter, the above-described process is successively performed among the multiple chips so that the timers are synchronized between the multiple chips that have timers and are connected to each other.

Time chart of timer correction process according to first embodiment

Figure 6:
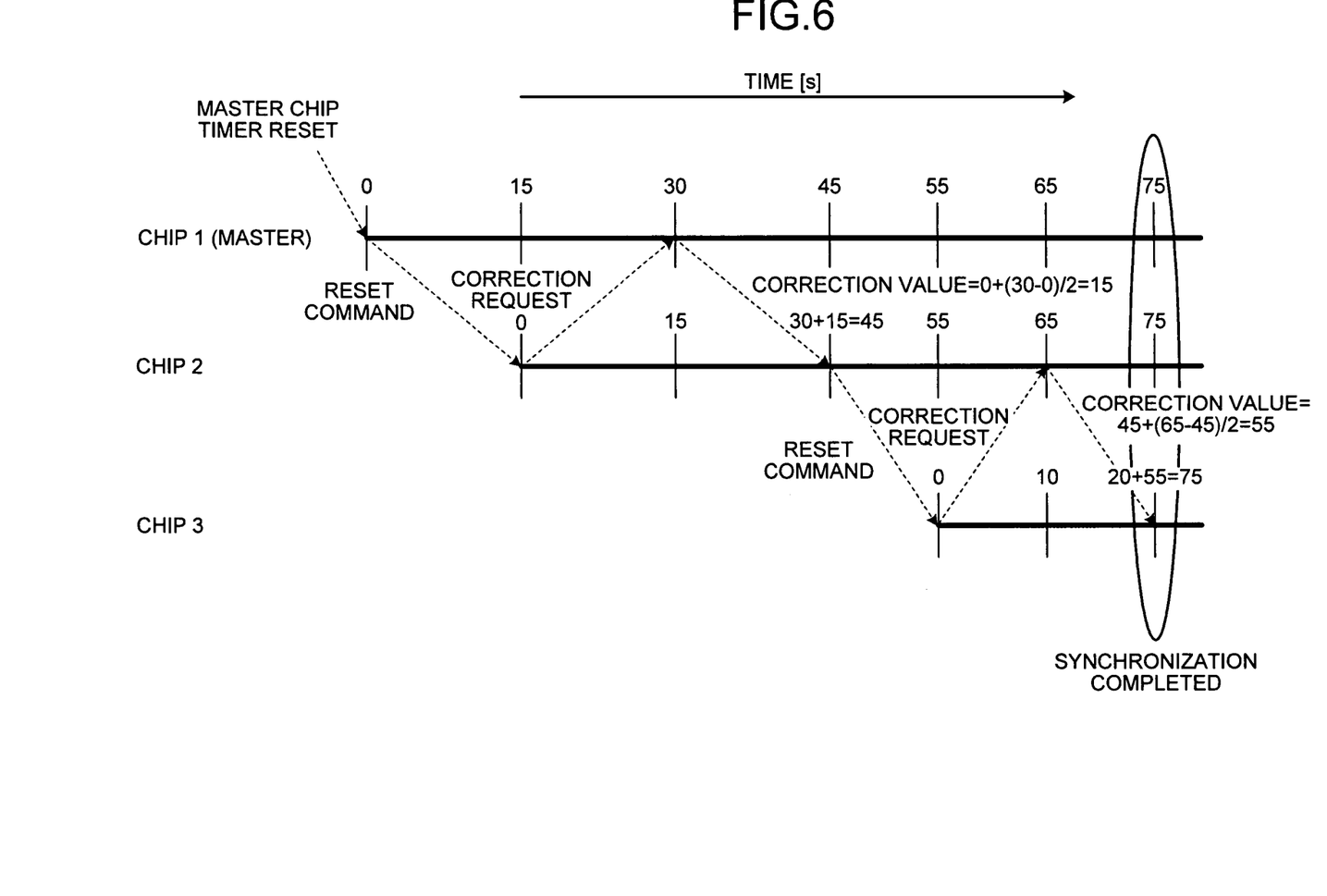
FIG. 6 is a diagram illustrating a time chart of the timer correction process according to the first embodiment.

A time chart of the timer correction process according to the first embodiment will be described here with reference to FIG. 6. FIG. 6 is a chart illustrating the time chart of the timer correction process according to the first embodiment. Hereinafter, an example will be described in which each of the timers of the chips 1 to 3 is corrected to synchronize the timers, assuming that the time required to transmit packets that are transmitted and received between the chip 1 and the chip 2 is 15 seconds and the time required to transmit packets that are transmitted and received between the chip 2 and the chip 3 is 10 seconds.

As illustrated in FIG. 6, when the system management board updates the correction completion flag that is stored in the register of the chip 1 to "1", the chip 1 initializes the time count information that is stored in the timer of the chip 1 as "0". When time count information that is stored in the timer of the chip 1 is initialized as "0", the chip 1 transmits a command for initializing the timer of the chip 2 to the chip 2.

The chip 2 that has received the command for initializing the timer initializes the time count information that is stored in the timer of the chip 2 as "0". When the time count information that is stored in the timer of the chip 2 is initialized as "0", the chip 2 transmits a correction time count information request to the chip 1.

The chip 1 that has received the correction time count information request from the chip 2 calculates a correction value (correction time count information) as "0+((30−0)÷2) =15" according to Equation 1. The chip 1 then transmits the calculated correction time count information "15" to the chip 2.

Correction value=(time required to transmit reset command packets+((time required to receive correction request packets−time required to transmit reset command packets)÷2))  (1)

The chip 2 that has received the correction time count information "15" from the chip 1 stores, in the timer of the chip 2, "45" that is obtained by summing the correction time count information "15" and the timer value "30" in the chip 2 and updates the correction completion flag that is stored in the register of the chip 2 to "1". As illustrated in FIG. 6, the timer correction process between the chip 1 and the chip 2 is completed and thus the timers of the chip 1 and the chip 2 are synchronized.

When there is the chip 3 that is adjacent to the chip 2, the chip 2 that has completed the timer correction process, transmits a command for initializing the timer of the chip 3 to the chip 3. The chip 3 that has received the command for initializing the timer of the chip 3 initializes the time count information that is stored in the timer of the chip 3 as "0". When the time count information that is stored in the timer of the chip 3 is initialized as "0", the chip 3 transmits a correction time count information request to the chip 2.

The chip 2 that has received the correction time count information request from the chip 3 calculates a correction value (correction time count information) as "45+((65−45) ÷2)=55" according to Equation 1. The chip 2 then transmits the calculated correction time count information "55" to the chip 3.

The chip 3 that has received the correction time count information "55" from the chip 2 stores, in the timer of the chip 3, "75" that is obtained by summing the correction time count information "55" and the timer value "20" in the chip 3 and updates the correction completion flag that is stored in the register of the chip 3 to "1". As illustrated in FIG. 6, the timer correction process between the chip 2 and the chip 3 is completed and thus the timers of the chip 1, the chip 2, and the chip 3 are synchronized.

Figure 7:
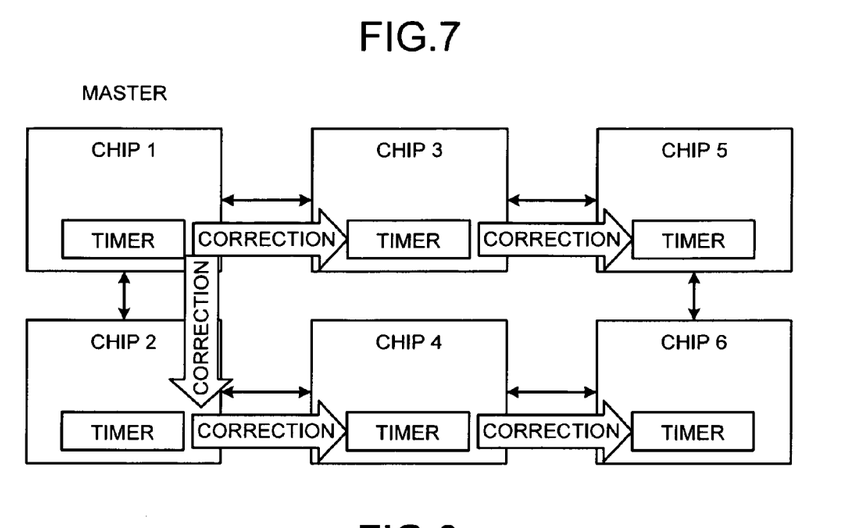
FIG. 7 is an image view illustrating that timers of multiple chips are sequentially corrected.

Because the above-described process is successively performed between adjacent chips, the timers of all the chips are synchronized, as illustrated in FIG. 7. For example, the chip 1 transmits timer initialization commands to the chip 2 and the chip 3 and performs the timer correction process. The chip 2 transmits a timer initialization command to a chip 4 and performs the timer correction process. The chip 4 transmits a timer initialization commands to a chip 6 and performs the timer correction process. The chip 3 transmits a timer initialization command to a chip 5 and performs the timer correction process. When the timer initialization command is transmitted and received between the chip 5 and the chip 6, if the correction completion flag is "1", the timer correction process is not performed between the chip 5 and the chip 6. FIG. 7 is an image view illustrating that timers of multiple chips are successively corrected.

Process performed by error processing unit according to the first embodiment

Figure 8:
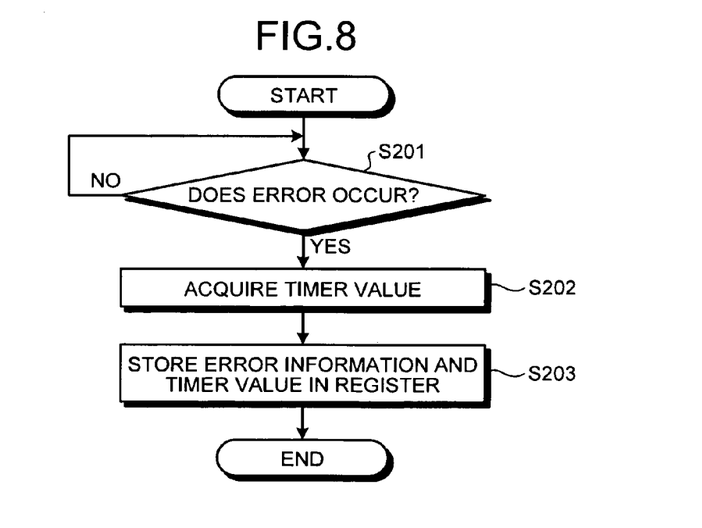
FIG. 8 is a flowchart of a procedure of error processing performed by an error processing unit according to the first embodiment.

The error processing performed by the error processing unit 50 according to the first embodiment will be described below with reference to FIG. 8. FIG. 8 is a flowchart of the procedure of the error processing performed by the error processing unit 50 according to the first embodiment. A case will be described below in which an error occurs after the timer correction process is performed in each chip.

As illustrated in FIG. 8, when an error occurs in the semiconductor device 10 (YES at step S201), the error processing unit 50 acquires the timer value "70" that is stored in the timer 30 (step S202). The error processing unit 50 stores the acquired timer value "70" and the error information "xA001 (error ID)" on the error in the register 20 (step S203).

Effects of the First Embodiment

Because the process for correcting the timers, which are mounted on the multiple semiconductor devices of the information processing apparatus, is successively performed among the multiple semiconductor devices, the information processing apparatus can shorten the time required to complete the process for synchronizing the timers (time information).

For example, when the system management board updates the correction completion flag to "1", the chip 1 initializes the time count information that is stored in the timer of the chip 1 as "0". The chip 1 transmits command packets for initializing the timer of the chip 2 to the chip 2. The chip 2 then initializes the time count information that is stored in the timer of the chip 2 as "0". The chip 2 then transmits correction timer count information command packets to the chip 1. Thereafter, the chip 1 calculates a correction value (correction time count information) according to the timer value in the chip 1 at the reception of the correction timer count information command packets from the chip 2 and transmits the calculated correction value to the chip 2. The chip 2 then sums the correction value, which is received from the chip 1, and the timer value in the chip 2, stores the resulting value in the timer of the chip 2, and updates the correction completion flag of the chip 2 to "1". Thereafter, the chip 2 transmits a timer initialization command to the chip 3. The multiple chips that are mounted on the information processing apparatus successively perform the above-described process via the chips so that all the timers are corrected. Accordingly, even if the information processing apparatus is configured to have a large-scale system configuration with multiple semiconductor devices, all the timers can be synchronized by quickly performing the timer correction process.

In the information processing apparatus, when an error occurs in the hardware after the timer correction process is completed, the timer value at the occurrence of the error and the contents of the error are stored in a predetermined register and thus it can be accurately known how the error occurred. Accordingly, the error can be analyzed easily.

[b] Second Embodiment

The embodiments of the information processing apparatus, the method of controlling an information processing apparatus, and the semiconductor device are described above. However, in addition to the above-described embodiments, the information processing apparatus, the method of controlling an information processing apparatus, and the semiconductor device may be carried out in various different modes. Thus, different embodiments will be described below regarding (1) system configuration and (2) initialization of correction flags.

(1) System Configuration

The process procedures, control procedures, specific names, information including various types of data and parameters (for example, various types of data that are stored in the register 20 illustrated in FIG. 2) that are illustrated in the specification and the drawings may be changed arbitrarily unless otherwise noted.

The components of each device illustrated in the drawings are functional concepts and thus are not necessarily required to be physically configured as illustrated in the drawings. In other words, the specific modes of separation or integration of devices are not limited to those illustrated in the drawings. The devices may be configured in a way that they are entirely or partially separated or integrated functionally or physically on an arbitrary basis in accordance with various loads or how they are used. For example, the timer correction controller 40 may be separated into a "timer corrector" that corrects the timer value of its own chip and a "correction value calculator" that calculates a timer correction value of an adjacent chip. Each processing function to be performed by each device may be entirely or arbitrarily partly implemented by a CPU using programs that are analyzed and executed by the CPU, or may be implemented as wired logic hardware.

(2) Initialization of Correction Flags

In the first embodiment, the case is described in which the correction completion flag is updated to "1" in each chip when the timer correction process is completed. However, the information processing apparatus, the method of controlling an information processing apparatus, and the semiconductor device are not limited to this. The correction completion flag may be initialized as "0" after the timer correction process is completed and the correction completion flag is updated to "1". For example, after the timer correction process is completed and the correction completion flag is updated to "1", the information processing apparatus may initialize the correction completion flag as "0" in accordance with the synchronization among the timers of the multiple chips. In addition, for example, the information processing apparatus that has completed the timer correction process may transmit, using the system management board, a correction flag initialization command to a predetermined chip and initialize the correction completion flag as "0" via the chips.

According to an embodiment of the invention as disclosed in this application, effects can be achieved in which the time required to complete the process for synchronizing the timers (time information) is shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
  a first semiconductor device and a second semiconductor device that are connected to each other; and
  a system control device that is connected to the first semiconductor device and the second semiconductor device, wherein
  the first semiconductor device includes
  a first time counter that counts the time by storing first time count information,
  a first storage unit that stores a first flag representing that the first time count information, which is stored in the first time counter, has been corrected,
  a first initialization controller that initializes the first time count information, which is stored in the first time counter, when the system control device updates the first flag,
  an initialization command transmitter that transmits an initialization command to the second semiconductor device according to an instruction from the first initialization controller when the first initialization controller initializes the first time count information that is stored in the first time counter,
  a correction time count information request receiver that receives a correction time count information request from the second semiconductor device after the initialization command transmitter transmits an initialization command to the second semiconductor device, and
  a correction time count information transmitter that transmits correction time count information to the second semiconductor device according to an instruction from the first initialization controller when the correction time count information request receiver receives a correction time count information request from the second semiconductor device, and
  the second semiconductor device includes
  a second time counter that counts the time by storing second time count information,
  a second storage unit that stores a second flag representing that the second time count information, which is stored in the second time counter, has been corrected;
  an initialization command receiver that receives the initialization command that is transmitted by the initialization command transmitter,
  a second initialization controller that initializes the second time count information, which is stored in the second time counter, when the initialization command receiver receives the initialization command,
  a correction time count information request transmitter that transmits a correction time count information request to the first semiconductor device according to an instruction from the second initialization controller when the second initialization controller initializes the second time count information, which is stored in the second time counter,
  a correction time count information receiver that receives the correction time count information, which is transmitted by the correction time count information transmitter, and
  a correction controller that sums correction time count information, which is received by the correction time count information receiver, and the second time count information, stores the resulting value in the second time counter, and updates the second flag.

2. The information processing apparatus according to claim 1, wherein
  the initialization command transmitter further transmits a first identifier representing the first semiconductor device to the second semiconductor device,
  the correction time count information transmitter further transmits a first identifier representing the first semiconductor device to the second semiconductor device, and
  the correction time count information request transmitter further transmits a second identifier representing the second semiconductor device to the first semiconductor device.

3. The information processing apparatus according to claim 1, wherein the correction time count information is a value that is obtained by dividing, by 2, a value that is obtained by summing the first time count information at transmittance of an initialization command, by the initialization command transmitter, to the second semiconductor device and the first time count information at transmittance of correction time count information, by the correction time count information transmitter, to the second semiconductor device.

4. The information processing apparatus according to claim 1, wherein
  the first semiconductor device further includes a first error processing unit that stores first time count information at occurrence of an error and contents of the error in the first storage unit when the error occurs in hardware of the first semiconductor device after the correction controller sums correction time count information, which is received by the correction time count information receiver, and the second time count information and, stores the resulting value in the second time counter, and updates the second flag, and
  the second semiconductor device further includes a second error processing unit that stores second time count information at occurrence of an error and contents of the error in the second storage unit when the error occurs in hardware of the second semiconductor device after the correction controller sums correction time count information, which is received by the correction time count information receiver, and the second time count information, stores the resulting value in the second time counter, and updates the second flag.

5. A semiconductor device that is connected to a system control device, comprising:

a time counter that counts the time by storing time count information;

a storage unit that stores a flag representing that the time count information, which is stored in the time counter, has been corrected;

an initialization controller that initializes the time count information, which is stored in the time counter, when the system control device updates the flag or when an initialization command is received from a first adjacent semiconductor device that is adjacent to the semiconductor device;

an initialization command transmitter that transmits an initialization command to a second adjacent semiconductor device (i) when the initialization controller initializes the time count information that is stored in the time counter in response to the system control device updating the flag, or (ii) when the time counter of the semiconductor device is corrected as a result of the initialization command from the first adjacent semiconductor device;

an initialization command receiver that receives the initialization command that is transmitted by the first adjacent semiconductor device;

a correction time count information request transmitter that transmits a correction time count request to the first adjacent semiconductor device according to an instruction from the initialization controller when the initialization controller initializes the time count information in response to the initialization command from the first adjacent semiconductor device;

a correction time count information request receiver that receives a correction time count information request, which is transmitted from the second adjacent semiconductor device, after the initialization command transmitter transmits an initialization command to the second adjacent semiconductor device;

a correction time count information transmitter that transmits correction time count information to the second adjacent semiconductor device according to an instruction from the initialization controller when the correction time count information request receiver receives a correction time count information request from the second adjacent semiconductor device;

a correction time count information receiver that receives the correction time count information, which is transmitted by the first adjacent semiconductor device; and a correction controller that sums correction time count information, which is received by the correction time count information receiver, and the time count information, stores the resulting value in the time counter, and updates the flag.

6. A method of controlling an information processing apparatus that includes a first semiconductor device and a second semiconductor device that are connected to each other; and a system control device that is connected to the first semiconductor device and the second semiconductor device, the method comprising:

counting, by the first semiconductor device, the time by storing first time count information;

storing, in a first storage unit of the first semiconductor device, a first flag representing that the first time count information has been corrected;

counting, by the second semiconductor device, the time by storing second time count information;

storing, in a second storage unit of the second semiconductor device, a second flag representing that the second time count information has been corrected;

initializing, by the first semiconductor device, the first time count information when the system control device updates the first flag;

transmitting, by the first semiconductor device, an initialization command to the second semiconductor device when the first time count information is initialized;

receiving, by the second semiconductor device, the initialization command that is transmitted from the first semiconductor device;

initializing, by the second semiconductor device, the second time count information when the initialization command is received;

transmitting, by the second semiconductor device, a correction time count information request to the first semiconductor device when the second time count information is initialized;

receiving, by the first semiconductor device, the correction time count information request that is transmitted by the second semiconductor device after the initialization command is transmitted to the second semiconductor device;

transmitting, by the first semiconductor device, correction time count information to the second semiconductor device when the correction time count information request is transmitted by the second semiconductor device;

receiving, by the second semiconductor device, the correction time count information that is transmitted from the first semiconductor device; and summing, by the second semiconductor device, the correction time count information, which is transmitted by the first semiconductor device, and the second time count information, updating the second time count information, and updating the second flag.

* * * * *